United States Patent
Han et al.

(10) Patent No.: US 12,399,392 B2
(45) Date of Patent: Aug. 26, 2025

(54) LIGHT ROUTE CONTROL MEMBER

(71) Applicant: LG INNOTEK CO., LTD., Seoul (KR)

(72) Inventors: Young Ju Han, Seoul (KR); In Hae Lee, Seoul (KR); Byung Sook Kim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 790 days.

(21) Appl. No.: 17/754,139

(22) PCT Filed: Sep. 11, 2020

(86) PCT No.: PCT/KR2020/012299
§ 371 (c)(1),
(2) Date: Mar. 24, 2022

(87) PCT Pub. No.: WO2021/060750
PCT Pub. Date: Apr. 1, 2021

(65) Prior Publication Data
US 2022/0291564 A1  Sep. 15, 2022

(30) Foreign Application Priority Data

Sep. 24, 2019 (KR) .................. 10-2019-0117293
Oct. 11, 2019 (KR) .................. 10-2019-0126057

(51) Int. Cl.
*G02F 1/1679* (2019.01)
*G02F 1/13* (2006.01)
(Continued)

(52) U.S. Cl.
CPC ............ *G02F 1/1323* (2013.01); *G02F 1/167* (2013.01); *G02F 1/1676* (2019.01); *G02F 1/1679* (2019.01); *G02F 1/1685* (2019.01)

(58) Field of Classification Search
CPC .... G02F 1/167; G02F 1/1676; G02F 2201/44; G02F 1/16762; G02F 2001/1678;
(Continued)

(56) References Cited

U.S. PATENT DOCUMENTS

| 8,094,364 B2 | 1/2012 | Park |
| 9,229,261 B2 | 1/2016 | Schwartz et al. |

(Continued)

FOREIGN PATENT DOCUMENTS

| CN | 103676257 A | 3/2014 |
| CN | 206450918 U | 8/2017 |

(Continued)

OTHER PUBLICATIONS

Office Action dated Dec. 26, 2024 in Korean Application No. 10-2019-0117293.
(Continued)

*Primary Examiner* — Brandi N Thomas
(74) *Attorney, Agent, or Firm* — Saliwanchik, Lloyd & Eisenschenk

(57) ABSTRACT

A light path control member according to an embodiment comprises: a first substrate; a first electrode disposed on the first substrate; a second substrate disposed on the first substrate; a second electrode disposed below the second substrate; a light conversion unit disposed between the first electrode and the second electrode; and a power supply unit connected to the first electrode and the second electrode, wherein the light conversion unit includes a partition wall part and a receiving part that are alternately arranged, the receiving part has a light transmittance that changes in response to the application of a voltage, the receiving part includes a dispersion liquid and a plurality of light absorbing particles dispersed in the dispersion liquid, the height of the receiving part is 15 μm to 25 μm, the width of the receiving (Continued)

part is 1.5 μm to 2.5 μm, and the power supply unit includes a power connection part connecting an external power source and the light conversion unit, and a power switch part for turning on/off the transmission of the voltage.

20 Claims, 13 Drawing Sheets

(51) Int. Cl.
    *G02F 1/167*     (2019.01)
    *G02F 1/1676*     (2019.01)
    *G02F 1/1685*     (2019.01)

(58) Field of Classification Search
    CPC .. G02F 1/13306; G02F 1/155; G02F 2201/12;
                         G02F 2203/01; G02F 1/16757
    See application file for complete search history.

(56) References Cited

U.S. PATENT DOCUMENTS

| | | | |
|---|---|---|---|
| 9,500,888 | B2 | 11/2016 | Schwartz et al. |
| 2009/0135468 | A1 | 5/2009 | Park |

FOREIGN PATENT DOCUMENTS

| | | | | |
|---|---|---|---|---|
| CN | 206930875 | * | 1/2018 | ............ G02F 1/167 |
| CN | 206930875 U | * | 1/2018 | |
| JP | 2013-190763 A | | 9/2013 | |
| KR | 10-2009-0054278 A | | 5/2009 | |
| KR | 10-2011-0113996 A | | 10/2011 | |
| KR | 10-2013-0124649 A | | 11/2013 | |
| KR | 10-2014-0085465 A | | 7/2014 | |
| KR | 10-2015-0125051 A | | 11/2015 | |
| KR | 10-2015-0126515 A | | 11/2015 | |
| KR | 10-2015-0127211 A | | 11/2015 | |
| KR | 10-2018-0004879 A | | 1/2018 | |
| KR | 10-2018-0096003 A | | 8/2018 | |
| KR | 10-2019-0063719 A | | 6/2019 | |

OTHER PUBLICATIONS

Office Action dated Jun. 19, 2024 in Korean Application No. 10-2019-0126057.
International Search Report dated Dec. 18, 2020 in International Application No. PCT/KR2020/012299.
Office Action dated May 22, 2025 in Chinese Application No. 202080067060.9.

\* cited by examiner

LIGHT ROUTE CONTROL MEMBER

CROSS-REFERENCE TO RELATED APPLICATIONS

This application is the U.S. national stage application of International Patent Application No. PCT/KR2020/012299, filed Sep. 11, 2020, which claims the benefit under 35 U.S.C. § 119 of Korean Application Nos. 10-2019-0117293, filed Sep. 24, 2019; and 10-2019-0126057, filed Oct. 11, 2019; the disclosures of each of which are incorporated herein by reference in their entirety.

TECHNICAL FIELD

An embodiment relates to a light route control member capable of controlling a viewing angle of emitted light.

BACKGROUND ART

A light-shielding film shields transmitting of light from a light source, and is attached to a front surface of a display panel which is a display device used for a mobile phone, a notebook, a tablet PC, a vehicle navigation device, a vehicle touch, etc., so that the light-shielding film adjusts a viewing angle of light according to an incident angle of light to express a clear image quality at a viewing angle needed by a user when the display transmits a screen.

In addition, the light-shielding film may be used for the window of a vehicle, building or the like to shield outside light partially to inhibit glare, or to inhibit the inside from being visible from the outside.

That is, the light-shielding film may be a light route control member that controls a movement path of light, block light in a specific direction, and transmit light in a specific direction. Accordingly, by controlling the light transmission angle by the light-shielding film, it is possible to control the viewing angle of the user.

Meanwhile, such a light-shielding film may be a light-shielding film that can always control the viewing angle regardless of the surrounding environment or the user's environment, and switchable light-shielding film that allows the user to turn on/off the viewing angle control according to the surrounding environment or the user's environment may be distinguished.

Meanwhile, such a switchable light-shielding film may be applied to a display device. However, since the switchable light-shielding film is fixed to a specific display device, there is a problem in that the range of use of the switchable light-shielding film is limited.

In addition, when the portable switchable light-shielding film is applied, there is a problem in that the light blocking characteristic of the switchable light-shielding film is reduced because the voltage applied to the power connection unit is low.

Therefore, there is a need for a light route control member capable of solving the above problems.

DISCLOSURE

Technical Problem

An embodiment is directed is to provide a portable and detachable optical path control member.

Technical Solution

A light route control member according to embodiment includes; a first substrate; a first electrode disposed on an upper surface of the first substrate; a second substrate disposed on the first substrate; a second electrode disposed on a lower surface of the second substrate; a light conversion unit disposed between the first electrode and the second electrode; and a power supply unit connected to the first electrode and the second electrode, and the conversion unit includes a partition wall unit and a receiving unit that are alternately disposed, and a light transmittance of the receiving unit is changed according to the application of the voltage, and the receiving unit includes a dispersion and a plurality of light absorbing particles dispersed in the dispersion, wherein the height of the receiving unit is 15 μm to 25 μm, and the width of the receiving unit is 1.5 μm to 2.5 μm, and the power supply unit includes a power connection unit for connecting an external power source and a light conversion unit; and a power switch unit configured to turn on-off the voltage transfer.

Advantageous Effects

A light route control member according to an embodiment includes power connection unit connected to the electrode.

Accordingly, the light route control member according to the embodiment may be connected to a display device to be used through a power connection unit to receive voltage and use it.

That is, the light route control member according to the embodiment is detachable and portable, and thus can be easily used in a desired display device.

In addition, the light route control member according to the embodiment may control the sizes of the receiving unit and the partition wall unit in order to maintain the characteristics of the light route control member even at a low voltage received from the power connection unit.

In addition, the light conversion unit of the light route control member has a multi-layer structure, and by driving them simultaneously or individually, the light route control member can be suitably used in a usage environment.

In addition, by varying the extending directions of the light conversion unit of the light route control member, it is possible to control viewing angles in four directions (up, down, left, and right) instead of two.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, a light route control member according to an embodiment will be described with reference to drawings. The light route control member described below relates to a switchable light route control member that drives in various modes according to the movement of electrophoretic particles application of a voltage.

Figure 1:
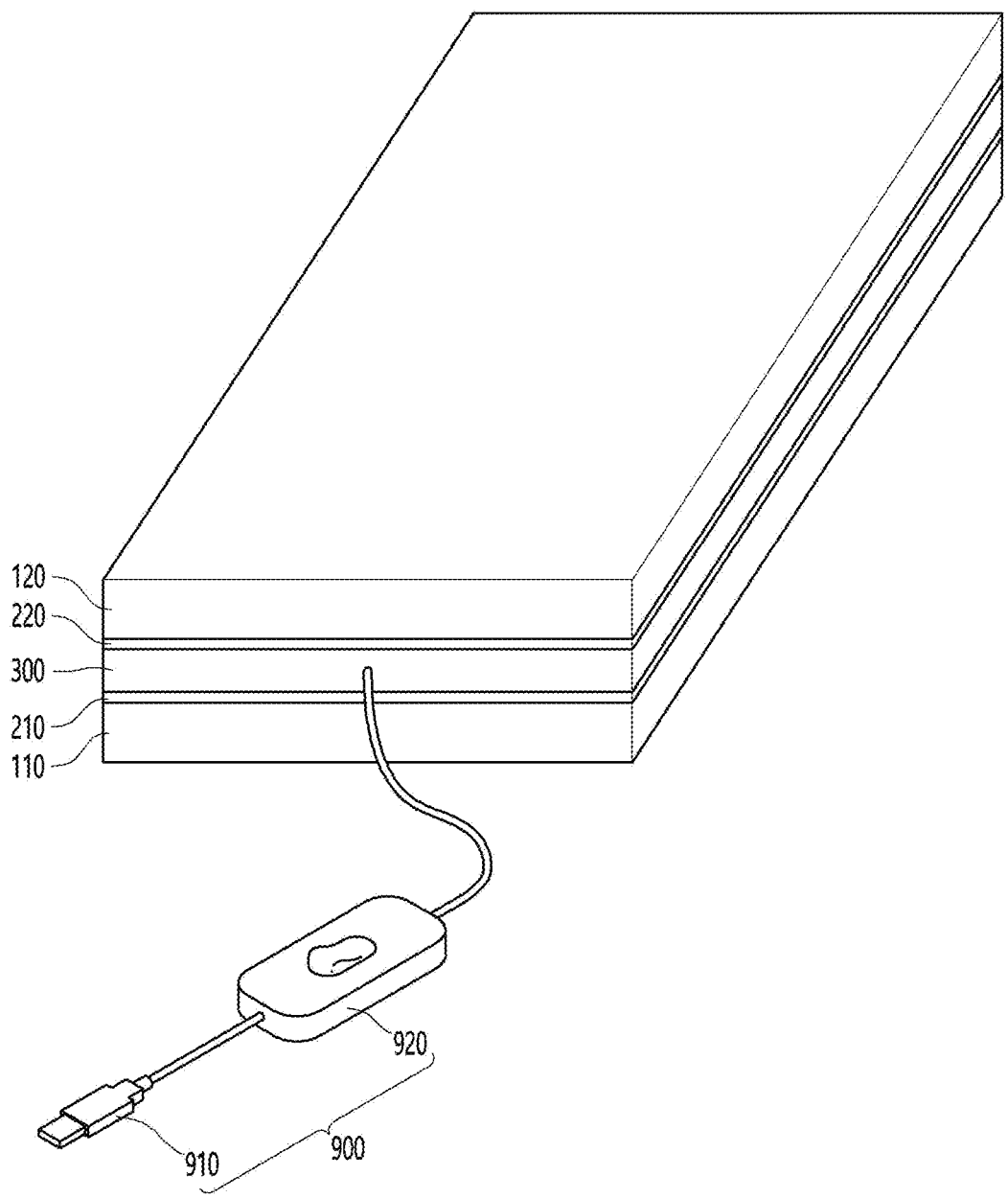
FIG. 1 is a view showing a perspective view of an light route control member according to an embodiment.
Figure 2:
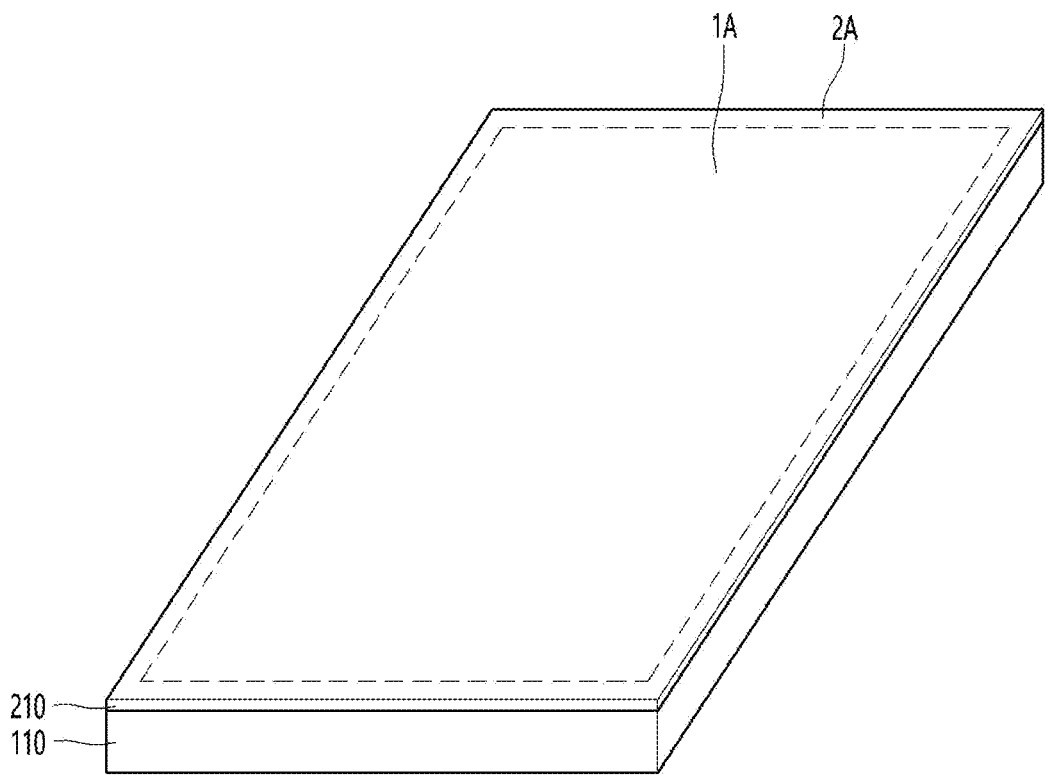
FIGS. 2 and 3 are views showing a perspective view of a first substrate and a first electrode, and a second substrate and a second electrode of the light route control member according to the embodiment, respectively.
Figure 3:
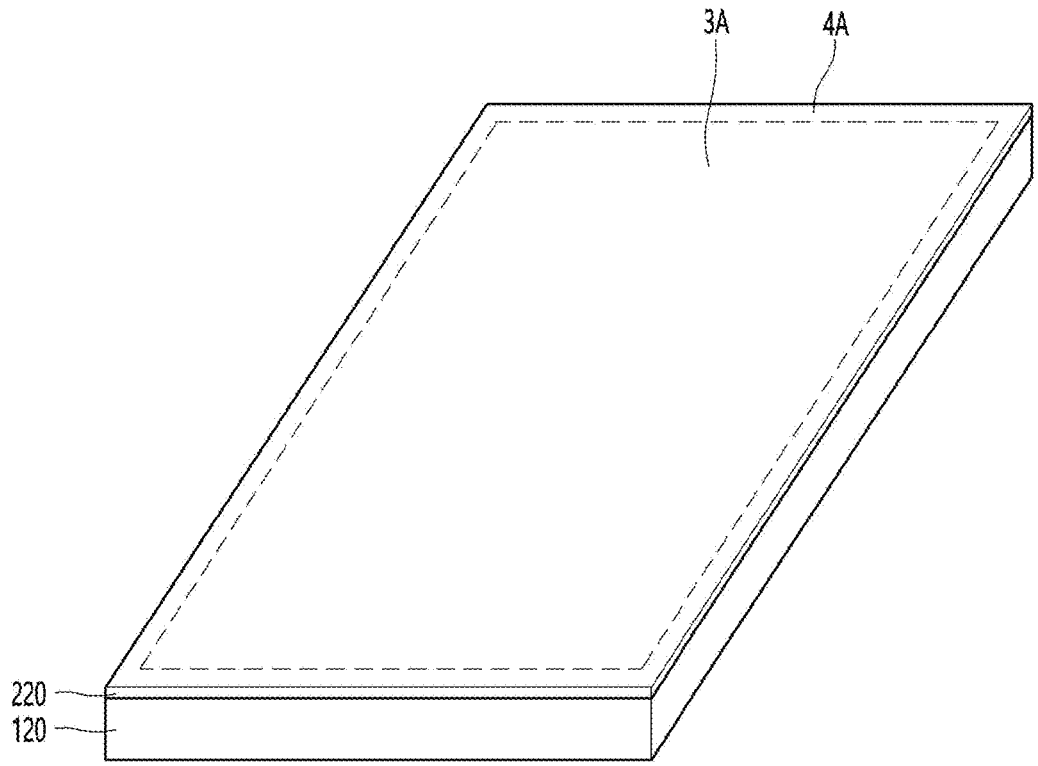

Referring to FIGS. 1 to 3, a light route control member according to an embodiment may include a first substrate 110, a second substrate 120, a first electrode 210, a second electrode 220, a light conversion unit 300 and power supply unit 900.

The first substrate 110 may support the first electrode 210. The first substrate 110 may be rigid or flexible.

In addition, the first substrate 110 may be transparent. For example, the first substrate 110 may include a transparent substrate capable of transmitting light.

The first substrate 110 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the first substrate 110 may be a flexible substrate having flexible characteristics.

Further, the first substrate 110 may be a curved or bended substrate. That is, the light route control member including the first substrate 110 may also be formed to have flexible, curved, or bent characteristics. Accordingly, the light route control member according to the embodiment may be changed to various designs.

The first substrate 110 may have a thickness of about 1 mm or less.

The first electrode 210 may be disposed on one surface of the first substrate 110. In detail, the first electrode 210 may be disposed on an upper surface of the first substrate 110. That is, the first electrode 210 may be disposed between the first substrate 110 and the second substrate 120.

The first electrode 210 may contain a transparent conductive material. For example, the first electrode 210 may contain a metal oxide such as indium tin oxide, indium zinc oxide, copper oxide, tin oxide, zinc oxide, titanium oxide, etc.

The first electrode 210 may be disposed on the first substrate 110 in a film shape. In detail, light transmittance of the first electrode 210 may be about 80% or more.

The first electrode 210 may have a thickness of about 10 nm to about 50 nm.

Alternatively, the first electrode 210 may contain various metals to realize low resistance. For example, the first electrode 210 may contain at least one metal of chromium (Cr), nickel (Ni), copper (Cu), aluminum (Al), silver (Ag), molybdenum (Mo). gold (Au), titanium (Ti), and alloys thereof.

The first electrode 210 may be disposed on the entire surface of one surface of the first substrate 110. In detail, the first electrode 210 may be disposed as a surface electrode on the first substrate 110.

In addition, the first electrode 210 may include a plurality of conductive patterns. For example, the first electrode 210 may include a plurality of mesh lines intersecting each other and a plurality of mesh openings formed by the mesh lines.

Accordingly, even though the first electrode 210 contains a metal, visibility may be improved because the first electrode is not visible from the outside. In addition, the light transmittance is increased by the openings, so that the brightness of the light route control member according to the embodiment may be improved.

Referring to FIG. 2, the first electrode 210 may include a first region 1A and a second region 2A. The first region 1A may be defined as a region that transmits an applied voltage to the light conversion unit 300. Also, the second region 2A may be defined as a region in which the first electrode 210 and the power supply unit 900 are connected.

The second substrate 120 may be disposed on the first substrate 110. In detail, the second substrate 120 may be disposed on the first electrode 210 on the first substrate 110.

The second substrate 120 may contain a material capable of transmitting light. The second substrate 120 may contain a transparent material. The second substrate 120 may contain a material the same as or similar to that of the first substrate 110 described above.

For example, the second substrate 120 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the second substrate 120 may be a flexible substrate having flexible characteristics.

Further, the second substrate 120 may be a curved or bended substrate. That is, the light route control member including the second substrate 120 may also be formed to have flexible, curved, or bent characteristics. Accordingly, the light route control member according to the embodiment may be changed to various designs.

The second substrate 120 may have a thickness of about 1 mm or less.

The second electrode 220 may be disposed on one surface of the second substrate 120. In detail, the second electrode 220 may be disposed on a lower surface of the second substrate 120. That is, the second electrode 220 may be disposed on a surface on which the second substrate 120 faces the first substrate 110. That is, the second electrode 220 may be disposed facing the first electrode 210 on the first substrate 110. That is, the second electrode 220 may be disposed between the first electrode 210 and the second substrate 120.

The second electrode 220 may contain a transparent conductive material. For example, the second electrode 220 may contain a metal oxide such as indium tin oxide, indium zinc oxide, copper oxide, tin oxide, zinc oxide, titanium oxide, etc.

The second electrode 220 may be disposed on the first substrate 110 in a film shape. In addition, the light transmittance of the second electrode 220 may be about 80% or more.

The second electrode 220 may have a thickness of about 10 nm to about 50 nm.

Alternatively, the second electrode 220 may contain various metals to realize low resistance. For example, the second electrode 220 may contain at least one metal of chromium (Cr), nickel (Ni), copper (Cu), aluminum (Al), silver (Ag), molybdenum (Mo). gold (Au), titanium (Ti), and alloys thereof.

The second electrode 220 may be disposed on the entire surface of one surface of the second substrate 120. In detail, the second electrode 220 may be disposed as a surface electrode on one surface of the first substrate 120

In addition, the second electrode 220 may include a plurality of conductive patterns. For example, the second electrode 220 may include a plurality of mesh lines intersecting each other and a plurality of mesh openings formed by the mesh lines.

Accordingly, even though the second electrode 220 contains a metal, visibility may be improved because the second electrode 220 is not visible from the outside. In addition, the light transmittance is increased by the openings, so that the brightness of the light route control member according to the embodiment may be improved.

Referring to FIG. 3, the second electrode 220 may include a third region 3A and a fourth region 4A. a position of the third region 3A and a position of the first region 1A may correspond to each other. Also, a position of the fourth region 4A and a position of the second region 2A may correspond to each other.

The third region 3A may be defined as a region that transmits an applied voltage to the light conversion unit 300. Also, the fourth region 4A may be defined as a region in which the second electrode 220 and the power supply unit 900 are connected.

The light conversion unit 300 may be disposed between the first substrate 110 and the second substrate 120. In detail, the light conversion unit 300 may be disposed between the first electrode 210 and the second electrode 220.

an adhesive layer 400 may be disposed between at least one of the light conversion units 300 and the first substrate 110 or between the light conversion unit 300 and the second substrate 120. The first substrate 110, the second substrate 120, and the light conversion unit 300 may be adhered to each other by the adhesive layer 400.

Figure 4:
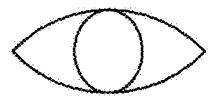
FIGS. 4 and 5 are views showing a cross-sectional view of a light route control member according to first embodiment.
Figure 4:
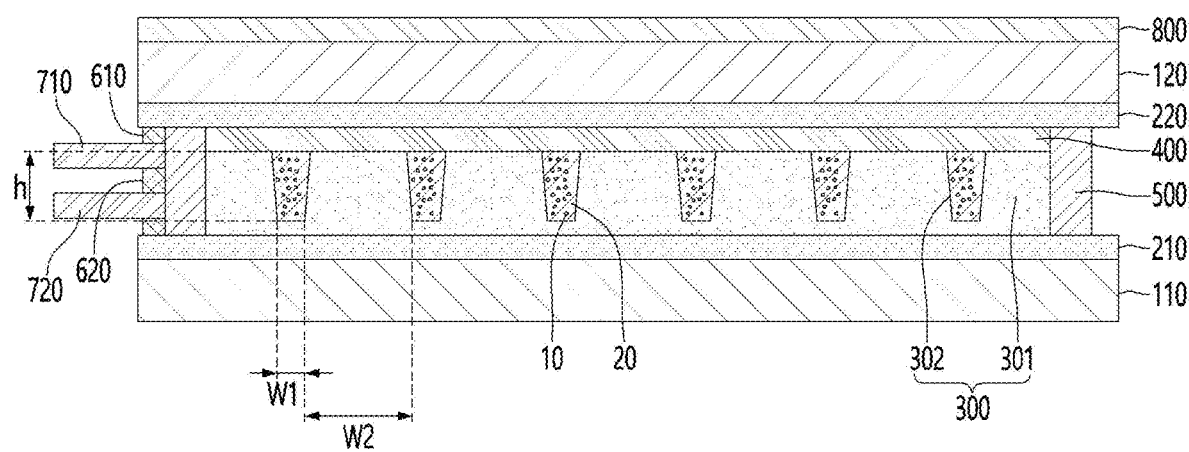
Figure 5:
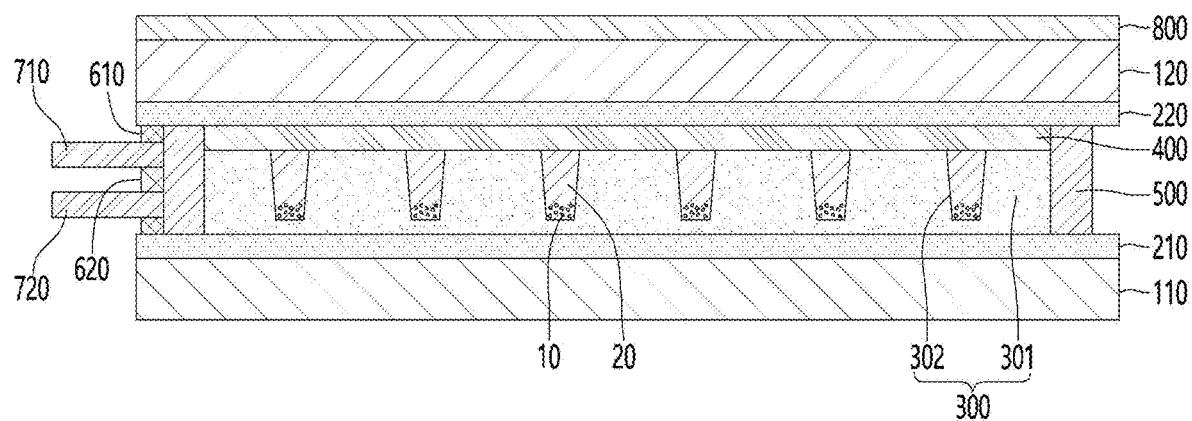

Referring to FIGS. 4 and 5, the light conversion unit 300 may include a partition wall unit 301 and a receiving unit 302.

The partition wall unit 301 may be defined as a partition wall region for partitioning a region of receiving unit 302. That is, the partition wall part 301 is a partition wall area dividing a plurality of a receiving unit. And the receiving unit 302 may be defined as a variable region that is variable to a light blocking unit and a light transmitting unit according to application of voltage.

The partition wall unit 301 and the receiving unit 302 may be alternately disposed. The partition wall unit 301 and the receiving unit 302 may be disposed in different widths. For example, the width of the receiving unit 302 may be greater than the width of the receiving unit 302.

The partition wall unit 301 and the receiving unit 302 may be alternately disposed. In detail, the partition wall unit 301 and the receiving unit 302 may be alternately disposed. That is, each of the partition wall units 301 may be disposed between the receiving units 302 adjacent to each other, and each of the receiving units 302 may be disposed between the partition wall units 301 adjacent to each other.

The partition wall unit 301 may contain a transparent material. The partition wall unit 301 may contain a material that may transmit light.

The partition wall unit 301 may contain a resin material. For example, the partition wall unit 301 may contain a photo-curable resin material. As an example, the partition wall unit 301 may contain a UV resin or a transparent photoresist resin. Alternatively, the partition wall unit 301 may contain urethane resin or acrylic resin.

The partition wall unit 301 may transmit light incident on any one of the first substrate 110 and the second substrate 120 toward another substrate.

For example, in FIGS. 4 and 5, light may be emitted in a direction of the first substrate 110 and the light may be incident in the direction of the second substrate 120. The partition wall unit 301 may transmit the light, and the transmitted light may be moved in a direction of the second substrate 120.

A sealing part 500 sealing the light route control member may be disposed on a side surface of the partition wall unit. And a side surface of the light conversion unit 300 may be sealed by the sealing part.

The receiving units 302 may include the dispersion 10 and the light absorbing particles 20 described above. In detail, the receiving unit 302 is filled with the dispersion 10, and a plurality of the light absorbing particles 20 may be dispersed in the dispersion 10.

In addition, a separate sealing layer is formed on the exposed surface of the dispersion to inhibit external impurities or air from penetrating into the dispersion.

The dispersion 10 may be a material for dispersing the light absorbing particles 20. The dispersion 10 may contain a transparent material. The dispersion 10 may contain a non-polar solvent. In addition, the dispersion 10 may contain a material capable of transmitting light. For example, the dispersion 10 may include at least one of a halocarbon-based oil, a paraffin-based oil, and isopropyl alcohol.

The light absorbing particles 20 may be disposed to be dispersed in the dispersion 10. In detail, the plurality of light absorbing particles 20 may be disposed to be spaced apart from each other in the dispersion 10.

The light absorbing particle 20 may have an electric charge on the particle surface. The light absorbing particles 20 may have a color. In detail, the light absorbing particles 20 may have a black color. For example, the light absorbing particles 20 may include carbon black particles.

The light transmittance of the receiving unit 302 may be changed by the light absorbing particles 20. In detail, the receiving unit 302 may be changed into the light blocking part and the light transmitting part by changing the light transmittance due to the movement of the light absorbing particles 20.

For example, the light route control member according to the embodiment may be changed from a first mode to a second mode or from the second mode to the first mode by a voltage applied to the first electrode 210 and the second electrode 220.

In detail, in the light route control member according to the embodiment, the receiving unit 302 becomes the light blocking part in the first mode, and light of a specific angle may be blocked by the receiving unit 302. That is, a viewing angle of the user viewing from the outside may be narrowed.

In addition, in the light route control member according to the embodiment, the receiving unit 302 becomes the light transmitting part in the second mode, and in the light route control member according to the embodiment, light may be transmitted through both the partition wall unit 301 and the receiving unit 302. That is, the viewing angle of the user viewing from the outside may be widened.

Switching from the first mode to the second mode, that is, the conversion of the receiving unit 302 from the light blocking part to the light transmitting part may be realized by movement of the light absorbing particles 20 of the receiving unit 302. Thai is, the light absorbing particle 20 has a charge on the surface, and may be moved in the direction of the first electrode or the second electrode by the application of a voltage according to the characteristics of the charge. That is, the light absorbing particle 20 may be an electrophoretic particle.

In detail, the receiving unit 302 may be electrically connected to the first electrode 210 and the second electrode 220.

In this case, when a voltage is not applied to the light route control member from the outside, the light absorbing particles 20 of the receiving unit 302 are uniformly dispersed in the dispersion 10, and light may be blocked by the light conversion particles in the receiving unit 302. Accordingly, in the first mode, the receiving unit 302 may be driven as the light blocking part.

Alternatively, when a voltage is applied to the light route control member from the outside, the light absorbing particles 20 may move. For example, the light absorbing particles 20 may move toward one end or the other end of the receiving unit 302 by a voltage transmitted through the first electrode 210 and the second electrode 220. That is, the light absorbing particles 20 may move from the receiving unit 302 toward the first electrode or the second electrode.

In detail, when a voltage is applied to the first electrode 210 and/or the second electrode 220, an electric field is formed between the first electrode 210 and the second electrode 220, and the charged carbon black, that is, the light absorbing particles may be moved toward a positive electrode of the first electrode 210 and the second electrode 220 using the dispersion 10 as a medium.

That is, when the voltage is not applied to the first electrode 210 and/or the second electrode 220, as shown in FIG. 4, the light absorbing particles 20 may be uniformly dispersed in the dispersion 10 to drive the receiving unit 302 as the light blocking part.

In addition, when the voltage is applied to the first electrode 210 and/or the second electrode 220, as shown in FIG. 5, the light absorbing particles 20 may be moved toward the first electrode 210 in the dispersion 10. That is, the light absorbing particles 20 are moved in one direction, and the receiving unit 302 may be driven as the light transmitting part Accordingly, the light route control member according to the embodiment may be driven in two modes according to a user's surrounding environment. That is, when the user requires light transmission only at a specific viewing angle, the receiving unit is driven as the light blocking part, or in an environment in which the user requires high brightness, a voltage may be applied to drive the receiving unit as the light transmitting part.

Therefore, since the light route control member according to the embodiment may be implemented in two modes according to the user's requirement, the light route control member may be applied regardless of the user's environment.

A sealing part 500 may be disposed on the outer surface of the light conversion unit 300. The sealing part 500 may inhibit external impurities or air from penetrating into the light conversion unit 300.

Referring to FIGS. 4 and 5, a wiring electrode may be connected to each of the first electrode 210 and the second electrode 220. In detail, the first electrode 210 may be connected to the first wiring electrode 710 through a connection part 610. Also, the second electrode 220 may be connected to the second wiring electrode 720 through the connection part 610. The first wiring electrode 710 and the second wiring electrode 720 may be insulated from each other by an insulating layer 620 between the first wiring electrode 710 and the second wiring electrode 720.

The connection part 610 may include a conductive material. For example, the connection part 610 may be formed by applying a silver (Ag) paste.

The first wiring electrode 710 and the second wiring electrode 720 connected to the first electrode 210 and the second electrode 220 may be connected to the power supply unit 900.

Referring to FIG. 1, the power supply unit 900 may include a power connection unit 910 and a power switch unit 920.

The power connection unit 910 may connect the light route control member to an external power source. In addition, the power switch unit 920 may perform a function of transmitting or blocking an externally applied voltage by turning the voltage transfer on/off.

The light route control member may be detachably attached to an object to be applied by the power supply 810 connected to the light route control member. That is, the light route control member is not fixedly applied to a specific display device, but is attached and used to a display device that a user wants to apply. In addition, when applied to another display device, it can be detached and applied to another display device for use.

In addition, the power of the light route control member may be transmitted from the power of the display device through the power supply unit, and may be transmitted to the light route control member.

For example, the power connector 910 may include a USB terminal. That is, after connecting the power connector 910 to a display device to be used, the light route control member may be attached to the display device for use. Next, when using the display device for another display device, the power connector 910 is disconnected from the display device, and then the power connector 910 is connected to the other display device. Then, the light route control member may be attached to another display device to be used.

Accordingly, the light route control member according to the embodiment may be easily attached to and detached from a display device to be used. That is, a portable light route control member may be possible.

Meanwhile, the drivable voltage of the power connection unit 910 may be about 5V. Accordingly, in order to drive the light route control member by the voltage of 5V, it is possible to control the sizes of the receiving unit and the partition wall unit of the light route control member.

In detail, referring to FIG. 4, the height h of the receiving unit may be 15 µm to 25 µm. When the height h of the receiving unit is less than 15 the viewing angle blocked by the receiving unit may be narrowed, and thus the shielding characteristics of the light route control member may be reduced. In addition, when the height h of the receiving unit exceeds 25 µm, the moving speed of the light absorbing particles 20 moving with the voltage applied from the power connection part 910 is reduced, so that the driving characteristics of the light route control member is reduced.

In addition, the width w1 of the receiving unit may be 1.5 µm to 2.5 µm. For example, the ratio (h/w1) of the height to the width of the receiving unit may be about 10 or less.

When the width w1 of the receiving unit is less than 1.5 the viewing angle blocked by the receiving unit may be narrowed, and thus the shielding characteristics of the light route controlling member may be reduced. In addition, when the width w1 of the receiving unit exceeds 2.5 µm, the viewing angle blocked by the receiving unit may be changed, so that the shielding characteristics of the light route control member may be reduced.

In addition, the width w2 of the partition wall unit may be 4.5 µm to 7.5 µm. When the width w2 of the partition wall unit is less than 4.5 the width of the partition wall unit through which light is transmitted becomes narrow, and thus the front luminance may be reduced. In addition, when the width w2 of the partition wall unit exceeds 7.5 µm, the viewing angle blocked by the receiving unit may be changed, so that the shielding characteristic of the light route control member may be reduced.

Figure 6:
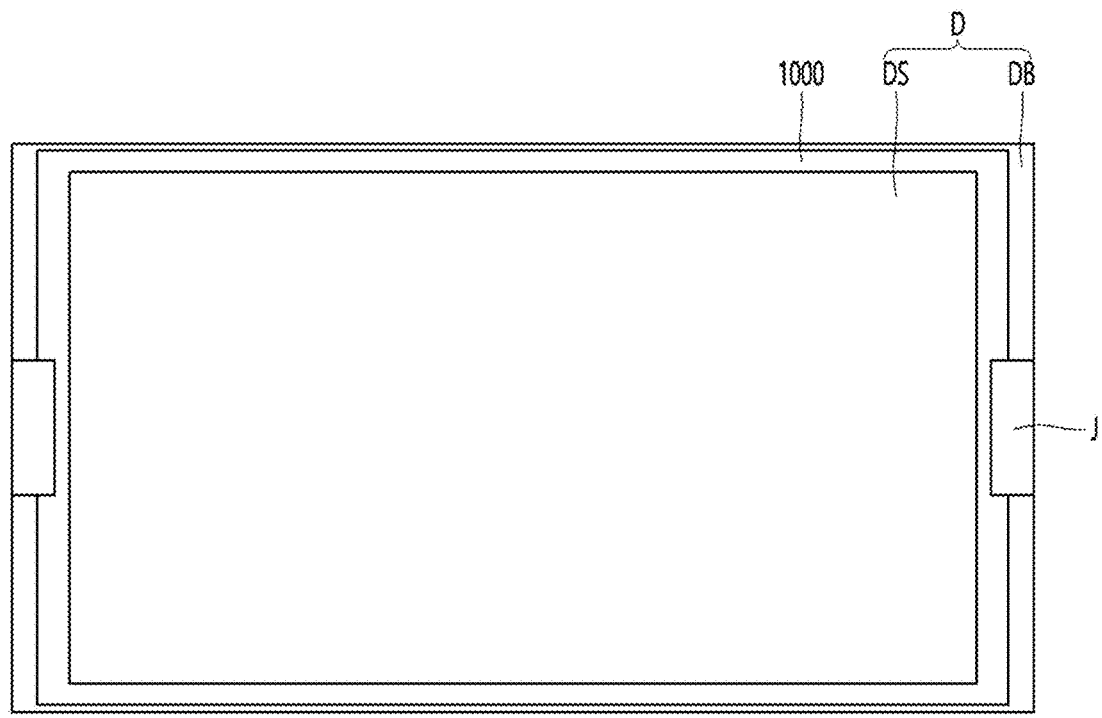
FIG. 6 is a view for explaining an example applied to a display of a light route control member according to the embodiment.

FIG. 6 is a view for explaining an example in which the light route control member according to the embodiment is applied to the display device D.

Referring to FIG. 6, the display device D may include a screen area DS and a bezel area DB. The light route control member 1000 may be disposed in the screen area DS and the bezel area DB in a film shape. In detail, the light route control member 1000 may be disposed to cover all of the screen area DS, and may be disposed to cover a part or all of the bezel area DB.

The light route control member 1000 and the display device D may be attached to each other through a separate fixing member J in the bezel area DB.

The fixing member J may be fixed to or detachable from the display device. The fixing member J is configured in the form of tongs, so that the light route control member 1000 can be detachably attached to the display device.

Alternatively, the fixing member J may be formed of a release film, and the light route control member 1000 may be detachably attached to the display device.

On the other hand, the protective layer 800 may be disposed on the first substrate 110 and/or the second substrate 120 in contact with the fixing member (J). The protective layer 800 may serve to inhibit fingerprints, scratches, etc. on the outer surface of the light route control member when the light route control member and the fixing member come into contact with each other. That is, the protective layer 800 may be a functional protective layer that has a certain strength and functions as an anti-fingerprint or anti-reflection function.

Meanwhile, the receiving unit 302 may be formed in various shapes.

Referring to FIGS. 4 and 5, the receiving unit 302 extends from one end of the receiving unit 302 to the other end, and the width of the receiving unit 302 may be changed.

For example, referring to FIGS. 4 and 5, the receiving unit 302 may be formed in a trapezoidal shape. In detail, the receiving unit 302 may extend from the first electrode 210 to the second electrode 220 and may be formed to widen the width of the receiving unit 302.

That is, the width of the receiving unit 302 may be narrowed while extending in the opposite direction from the user's viewing surface. In addition, when a voltage is applied to the light conversion unit, the light absorbing particles of the receiving unit 302 may move in a direction in which the width of the receiving unit is narrowed.

That is, the width of the receiving unit 302 may be increased while extending from the light incident part to which the light is incident to the light output part from which the light is emitted.

Accordingly, since the light absorbing particles move in a direction opposite to the viewing surface rather than the viewing surface, blocking of light emitted in the viewing surface direction can be inhibited, thereby improving the luminance of the light route control member.

In addition, since the light absorbing particles move from a wide region to a narrow region, the light absorbing particles may be easily moved.

In addition, since the light absorbing particles move to a narrow area of the receiving unit, the amount of light transmitted in the direction of the user's viewing surface is increased, thereby improving the front luminance.

Alternatively, on the contrary, the receiving unit 302 may extend from the first electrode 210 to the second electrode 220 and may be formed to have a narrow width of the receiving unit 302.

That is, the width of the receiving unit 302 may be widened while extending from the user's viewing surface to the opposite surface direction. In addition, when a voltage is applied to the light conversion unit, the light absorbing particles of the receiving unit 302 may move in a direction in which the width of the receiving unit is widened.

That is, the width of the receiving unit 302 may be narrowed while extending from the light incident part to which the light is incident to the light output part from which the light is emitted.

Accordingly, the contact area between the first electrode and one surface of the receiving unit through which the light absorbing particles move is increased, so that the moving speed of the light absorbing particles, that is, the driving speed may be increased.

Figure 7:
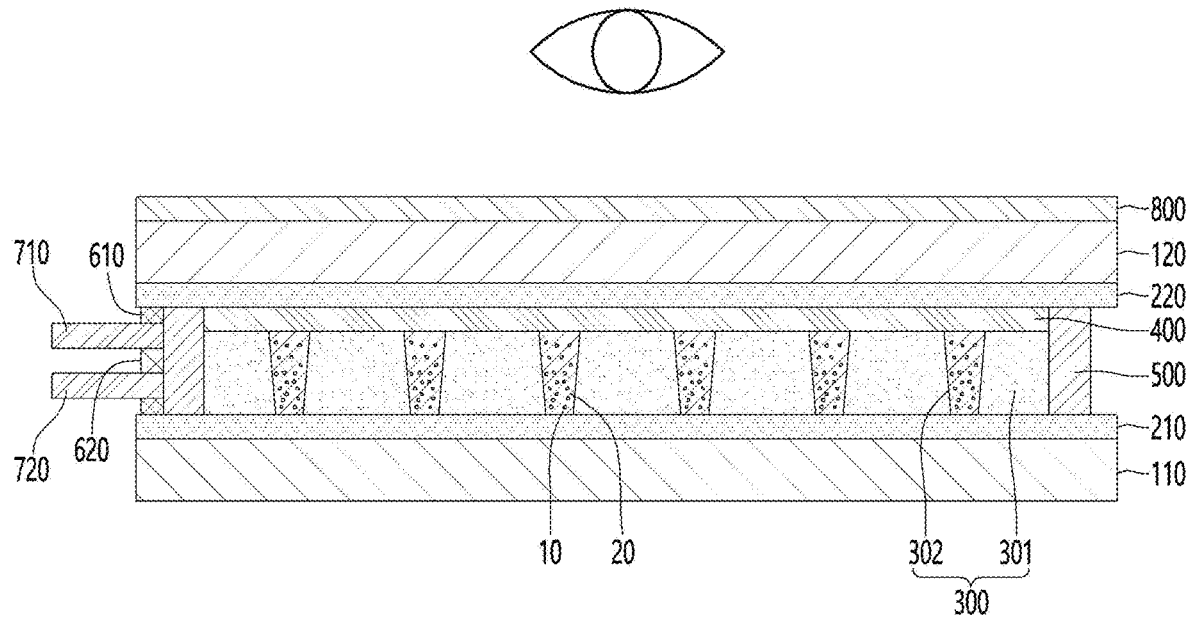
FIGS. 7 to 10 are views showing a cross-sectional view of a light route control member according to first embodiment.
Figure 8:
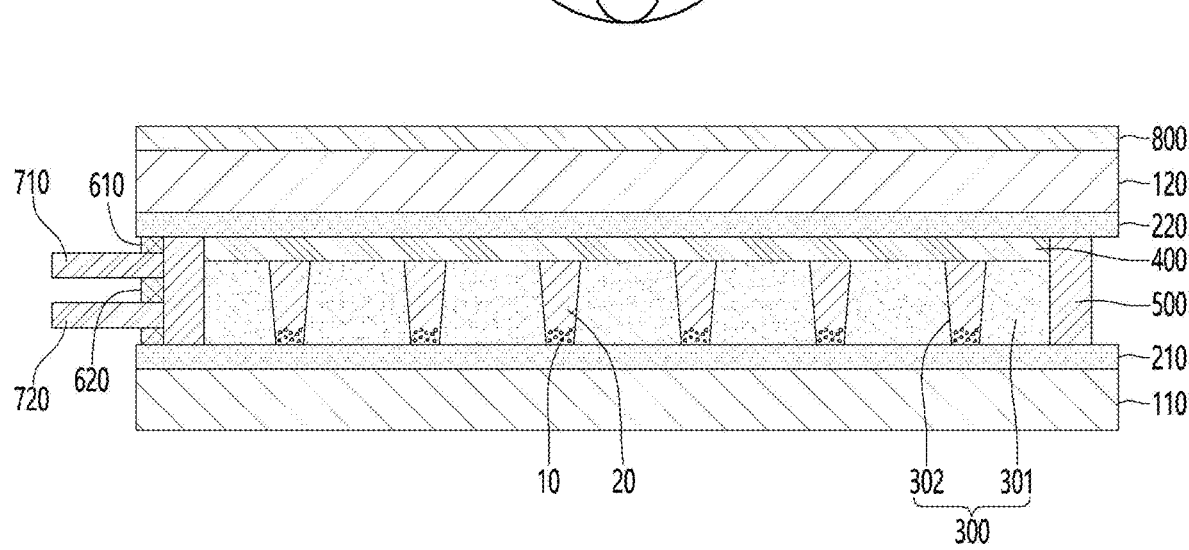

Alternatively, the embodiment is not limited thereto, and as shown in FIGS. 7 and 8, both ends of the receiving unit may be disposed to extend to the first electrode 210 and the second electrode 220, respectively.

Figure 9:
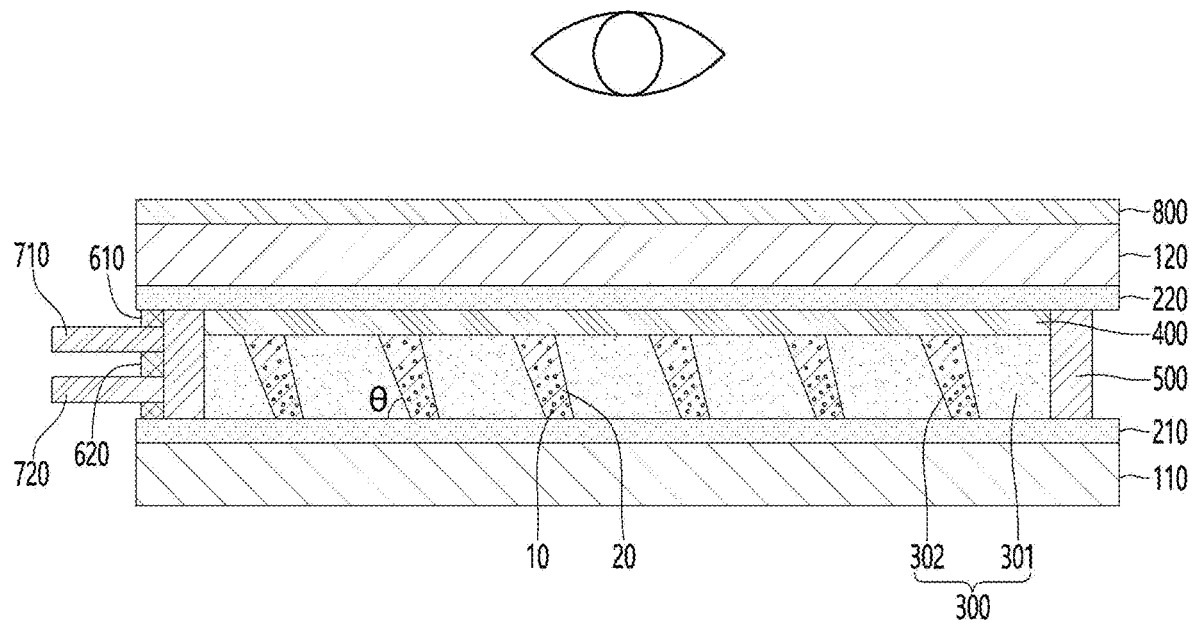
Figure 10:
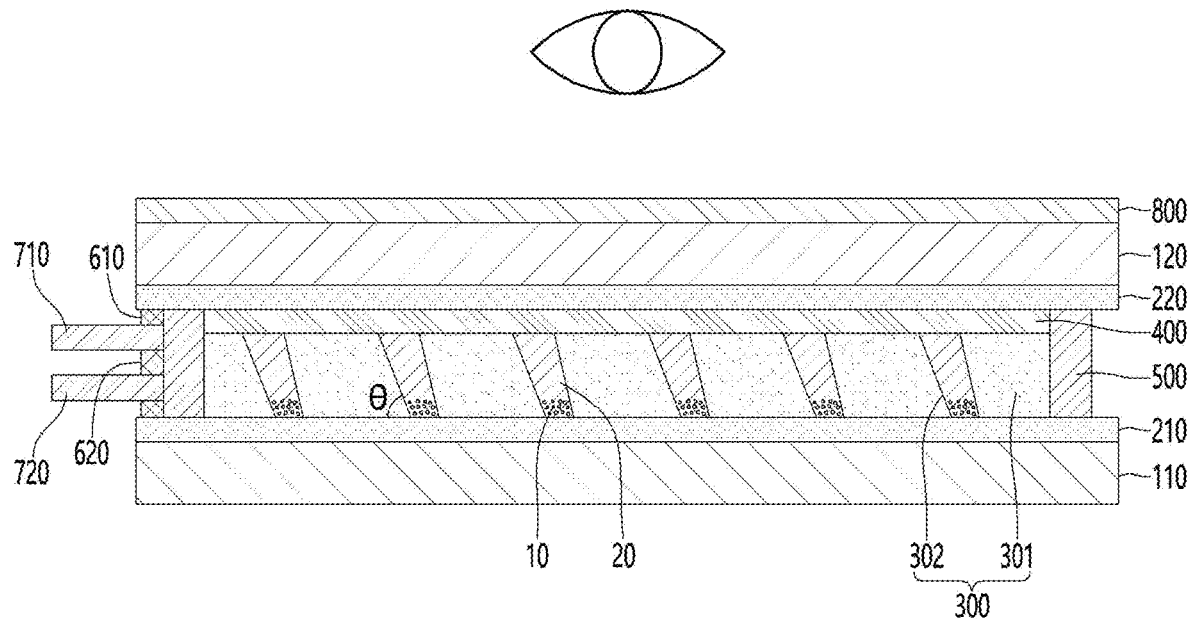

In addition, the receiving unit 302 may be disposed with a constant inclination angle θ. In detail, referring to FIGS. 9 and 10, the receiving unit 302 may be disposed while having an inclination angle θ of greater than 0° to less than 90° with respect to the first electrode 210. In detail, the receiving unit 302 may extend upwardly while having an inclination angle θ of greater than 0° to less than 90° with respect to one surface of the first electrode 210.

Accordingly, when the light route member is used together with the display panel, moire caused by overlapping of the pattern of the display panel and the receiving unit 302 of the light route control member may be inhibited, thereby improving user visibility.

Hereinafter, a light route control member according to another embodiment will be described with reference to FIGS. 11 to 14. In the description of the light route control member according to another embodiment, the same and similar to the light route control member according to the above-described embodiment the description is omitted, and the same reference numerals are assigned to the same components.

The light route control member according to another embodiment further includes third substrates 130 between the first substrate 110 and the second substrate 120, and a first light conversion unit 310 under the third substrate and a second light conversion unit 320 disposed on the third substrate.

The third substrate 130 may be disposed on the first substrate 110. The third substrate 130 may be disposed under the second substrate 120. In detail, the third substrate 130 may be disposed between the first substrate 110 and the second substrate 120.

The third substrate 130 may include a material capable of transmitting light. The third substrate 130 may include a transparent material. The second substrate 130 may include the same or similar material to the first substrate 110 and the second substrate 120 described above.

For example, the third substrate 130 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the third substrate 130 may be a flexible substrate having flexible characteristics.

Further, the third substrate 130 may be a curved or bended substrate. That is, the light route control member including the third substrate 130 may also be formed to have flexible, curved, or bent characteristics. Accordingly, the light route control member according to the embodiment may be changed to various designs.

The third substrate 130 may have a thickness of about 1 mm or less.

The third electrode 230 and the fourth electrode 240 may be respectively disposed on one surface of the third substrate 130. In detail, the third electrode 230 may be disposed on a lower surface of the third substrate 130, and the fourth electrode 240 may be disposed on an upper surface opposite to the lower surface of the third substrate 130.

That is, the third electrode 230 may be disposed to face the first electrode 210, and the fourth electrode 240 may be disposed to face the second electrode 220.

The third electrode 230 and the fourth electrode 240 may contain a transparent conductive material. For example, the third electrode 230 and the fourth electrode 240 may contain a metal oxide such as indium tin oxide, indium zinc oxide, copper oxide, tin oxide, zinc oxide, titanium oxide, etc.

The third electrode 230 and the fourth electrode 240 may be disposed on the third substrate 130 in a film shape. In detail, light transmittance of the third electrode 230 and the fourth electrode 240 may be about 80% or more.

The third electrode 230 and the fourth electrode 240 may have a thickness of about 10 nm to about 50 nm.

Alternatively, the third electrode 230 and the fourth electrode 240 may contain various metals to realize low resistance. For example, the third electrode 230 and the fourth electrode 240 may contain at least one metal of chromium (Cr), nickel (Ni), copper (Cu), aluminum (Al), silver (Ag), molybdenum (Mo). gold (Au), titanium (Ti), and alloys thereof.

In addition, the third electrode 230 and the fourth electrode 240 may include a plurality of conductive patterns. For example, the third electrode 230 and the fourth electrode 240 may include a plurality of mesh lines intersecting each other and a plurality of mesh openings formed by the mesh lines.

In addition, the third electrode 230 and the fourth electrode 240 include a plurality of conductive patterns. For example, the third electrode 230 and the fourth electrode 240 may include a plurality of mesh lines intersecting each other and a plurality of mesh openings formed by the mesh lines.

Accordingly, even though the third electrode 230 and the fourth electrode 240 contains a metal, visibility may be improved because the first electrode is not visible from the outside. In addition, the light transmittance is increased by the openings, so that the brightness of the light route control member according to the embodiment may be improved.

Figure 11:
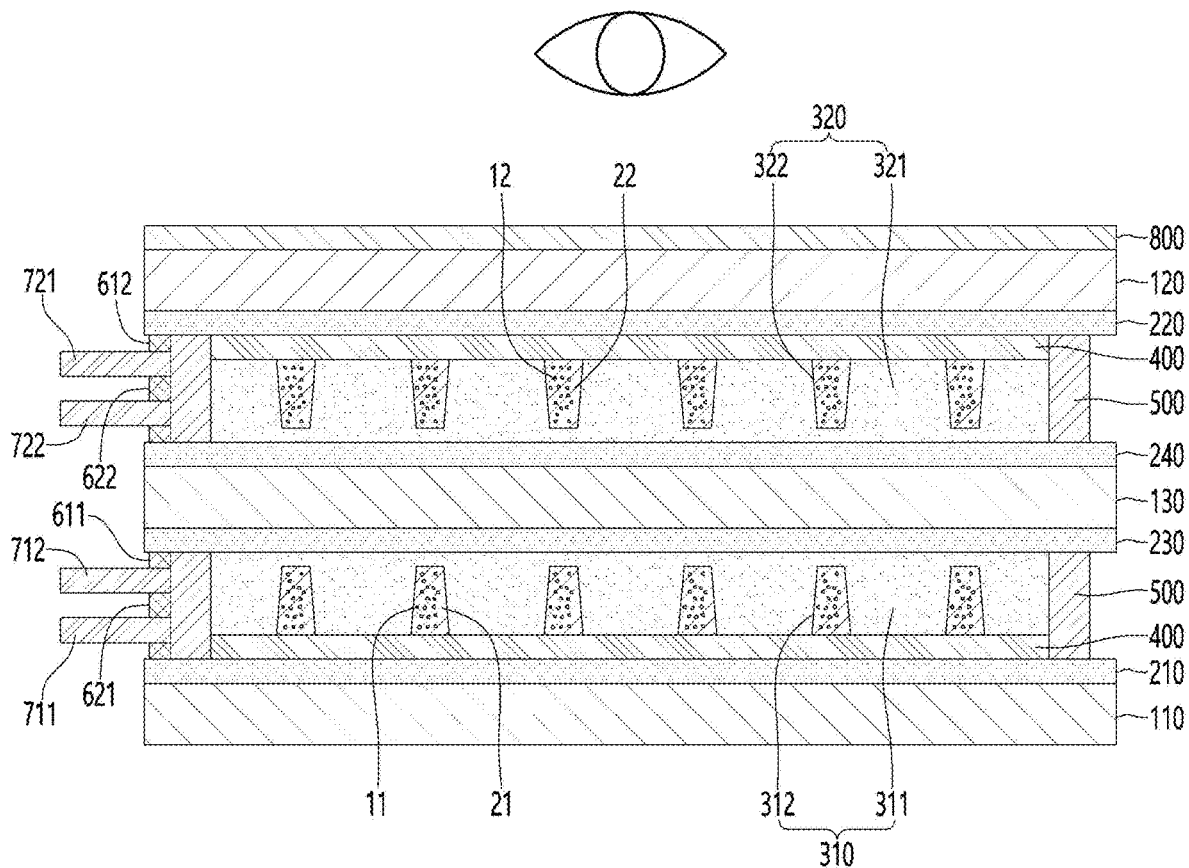
FIGS. 11 and 12 are views showing a cross-sectional view of a light route control member according to second embodiment.
Figure 12:
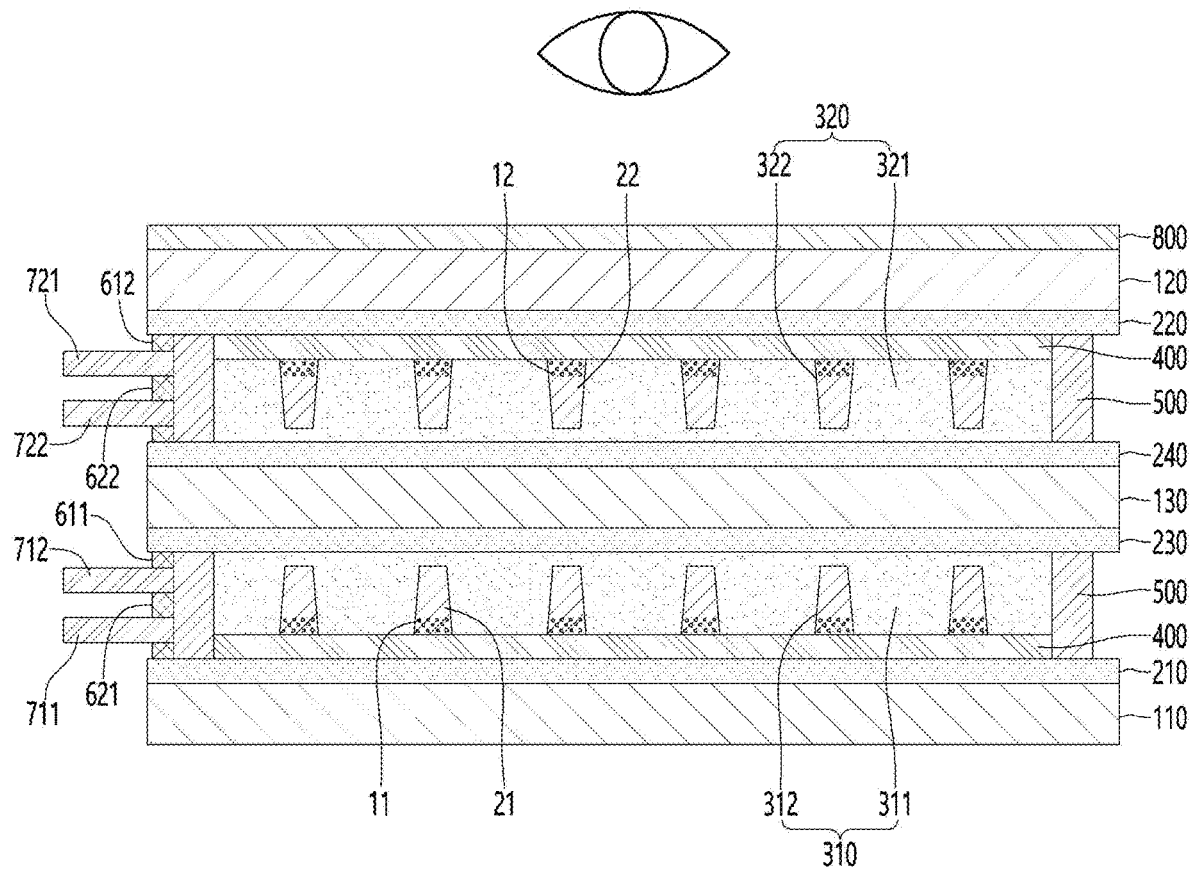

Referring to FIGS. 11 and 12, the light conversion unit may include a first light conversion unit 310 and a second light conversion unit 320.

In detail, the light conversion unit includes the first light conversion unit 310 between the first substrate 110 and the third substrate 130, the second light conversion unit 320 between the second substrate 120 and the third substrate 130.

The first light conversion part 310 may include a first partition wall part 311 and a first receiving unit 312. A first dispersion 11 and the first light absorbing particles 21 dispersed in the first dispersion 11 may be disposed in the first receiving unit 312.

In addition, the second light conversion part 320 may include a second partition wall part 321 and a second receiving unit 322. The second dispersion 12 and the second light absorbing particles 22 dispersed in the second dispersion 12 may be disposed in the second receiving unit 322.

In addition, between the first substrate 110 and the third substrate 130, a 1-1 wiring electrode 711 connected to the first electrode 210, and a 1-2 wiring electrode 712 connected to the third electrode 230 may be disposed.

The first electrode 210 and the third electrode 230 may be respectively connected to the 1-1 wiring electrode 711 and the 1-2 wiring electrode 712 through a first connection part 611. In addition, the 1-1 wiring electrode 711 and the 1-2 wiring electrode may be insulated from each other through the first insulating layer 621 between the 1-1 wiring electrode 711 and the 1-2 wiring electrode 712.

In addition, between the second substrate 120 and the third substrate 130, a 2-1 wiring electrode 721 connected to the second electrode 220, and a 2-2 wiring electrode 722 connected to the fourth electrode 240 may be disposed.

The second electrode 220 and the fourth electrode 240 may be respectively connected to the 2-1 wiring electrode 721 and the 2-2 wiring electrode 722 through a second connection part 612. In addition, the 2-1 wiring electrode 721 and the 2-2 wiring electrode may be insulated from each other through the second insulating layer 622 between the 2-1 wiring electrode 721 and the 2-2 wiring electrode 722.

The 1-1 wiring electrode 711, the 1-2 wiring electrode 712, the 2-1 wiring electrode 721, and the 2-2 wiring electrode 722 may be connected to the power supply unit 900. In addition, the 1-1 wiring electrode 711, the 1-2 wiring electrode 712, the 2-1 wiring electrode 721, and the 2-2 wiring electrode 722 are connected in parallel to each other, the same voltage may be applied to the first light conversion unit 310 and the second light conversion unit 320.

FIGS. 11 and 12 illustrate that the first and second light conversion units are disposed, the embodiment is not limited thereto, and the light route control member according to the embodiment may be formed in a plurality of multi-layered structures according to the front luminance and viewing angle to be implemented, such as the third, fourth, and fifth light conversion units.

As the light route control member according to another embodiment is formed of at least two layers, the light route control member may be driven by a voltage of 5V without reducing the width of the receiving unit. Accordingly, by improving the shielding characteristics of the light route control member, it is possible to implement a desired viewing angle.

Meanwhile, the first receiving unit 312 and the second receiving unit 322 may be disposed to extend in the same or different directions.

For example, the first receiving unit 312 and the second receiving unit 322 may be disposed to extend in the same longitudinal direction. When the first receiving unit 312 and the second receiving unit 322 are arranged to extend in the same longitudinal direction, the light route control member may control a viewing angle in one of the left and right directions or the up and down direction. That is, when the first receiving unit 312 and the second receiving unit 322 are disposed to extend in the same longitudinal direction, the light route control member may control the viewing angles of light in two directions.

Figure 13:
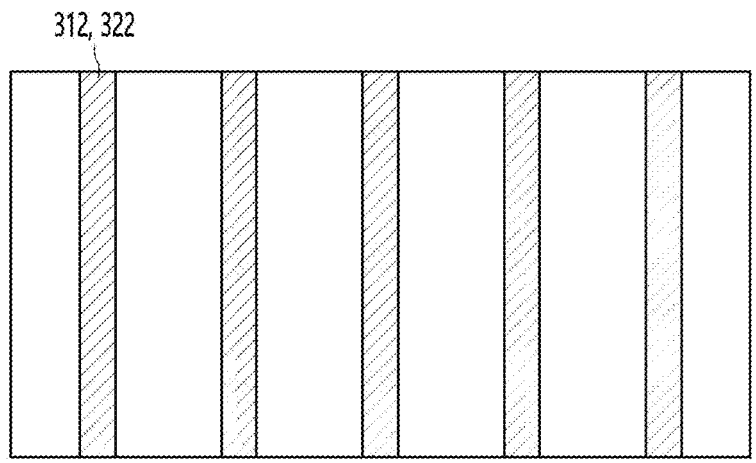
FIGS. 13 and 14 are views for explaining the overlapping relationship of the first receiving unit and the second receiving unit.
Figure 14:
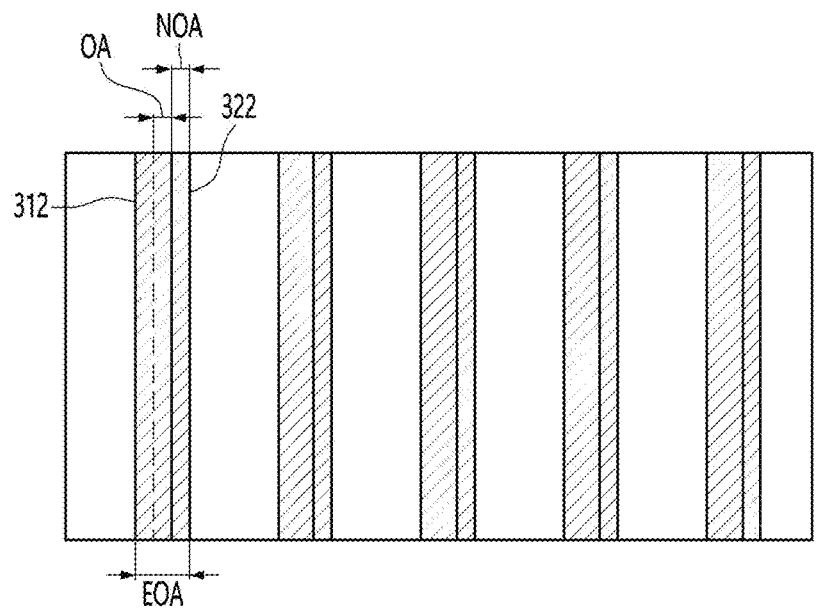

For example, referring to FIGS. 13 and 14, the first receiving unit 312 and the second receiving unit 322 may be disposed to overlap each other. In detail, the first receiving unit 312 and the second receiving unit 322 may be disposed to overlap each other based on the viewing surface of the light route member viewed by the user.

Referring to FIG. 13, the first receiving unit 312 and the second receiving unit 322 may extend in the same longitudinal direction and overlap each other. That is, the first receiving unit 312 and the second receiving unit 322 may be completely overlapped in upper and lower portions.

Alternatively, referring to FIG. 14, the first receiving unit 312 and the second receiving unit 322 may extend in the same longitudinal direction and overlap each other. That is, the first receiving unit 312 and the second receiving unit 322 may be disposed to partially overlap with the upper and lower portions.

Accordingly, the first receiving unit 312 and the second receiving unit 322 may include an overlapping area OA and a non-overlapping area NOA.

A width of the overlapping area OA may be greater than a width of the non-overlapping area NOA. In detail, the width of the non-overlapping area NOA may be less than or equal to about 10% of the total area EOA.

When the width of the non-overlapping area NOA exceeds 10%, the width of the receiving unit serving to block the light may be increased, and thus the front luminance of the light route control member may be reduced.

Alternatively, the first receiving unit 312 and the second receiving unit 322 may be arranged to extend in different longitudinal directions. That is, the first receiving unit 312 and the second receiving unit 322 may be disposed to extend in a direction crossing each other.

For example, the first receiving unit 312 may extend in a first direction, and the second receiving unit 322 may extend in a second direction intersecting the first direction.

When the first receiving unit 312 and the second receiving unit 322 are arranged to extend in different longitudinal directions, the light route control member may control viewing angles in left and right directions and up and down directions. That is, when the first receiving unit 312 and the second receiving unit 322 extend in different longitudinal directions, the light route control member may control viewing angles of light in four directions.

Meanwhile, the first light conversion unit 310 and the second light conversion unit 320 may be driven simultaneously with each other or may be driven separately from each other.

For example, when a voltage is applied to the light route control member, the first light conversion unit and the second light conversion unit may be simultaneously driven.

In detail, in the first mode, both the first light conversion unit 310 and the second light conversion unit 320 are driven by the light blocking unit. And, in the second mode in which a voltage is applied to the light route control member, the first light conversion unit 310 and the second light conversion unit 320 may be driven as a light transmitting unit by movement of light absorbing particles.

Alternatively, when a voltage is applied to the light route control member, the first light conversion unit and the second light conversion unit may be driven separately from each other.

In detail, in the first mode, the first light conversion unit 310 and the second light conversion unit 320 are driven by a light blocking unit. And in the second mode in which a voltage is applied to the light route control member, the first light conversion unit 310 or the second light conversion unit 320 may be driven as a light transmitting unit by movement of light absorbing particles.

Accordingly, the transmittance of the light route control member may be controlled according to the use environment. That is, in an environment requiring high transmittance, the transmittance of the light route control member may be increased by simultaneously driving the first light conversion unit 310 and the second light conversion unit 320.

In addition, in an environment requiring low transmittance, the transmittance of the light route control member may be controlled by individually driving the first light conversion unit 310 or the second light conversion unit 320.

Accordingly, the voltage applied to the light route control member may be reduced, and thus the lifetime of the light route control member may be increased.

In addition, the first light conversion unit 310 and the second light conversion unit 320 may be disposed to extend in different directions. By this, In an environment in which viewing angle control in two directions is required, the first light conversion unit 310 or the second light conversion unit 320 is individually driven, thereby controlling the viewing angle control direction of the light route control member.

In addition, the first light conversion unit 310 and the second light conversion unit 320 may be disposed to extend in different directions. Accordingly, in an environment requiring control of viewing angles in four directions, the first light conversion unit 310 and the second light conversion unit 320 are simultaneously driven, thereby controlling the viewing angle control direction of the light route control member.

That is, the light route control member according to the embodiment may simultaneously drive or individually drive the first light conversion unit and the second light conversion unit according to a usage environment. Accordingly, it is possible to implement a transmittance suitable for the use environment. In addition, the lifetime of the light route control member can be improved.

Figure 15:
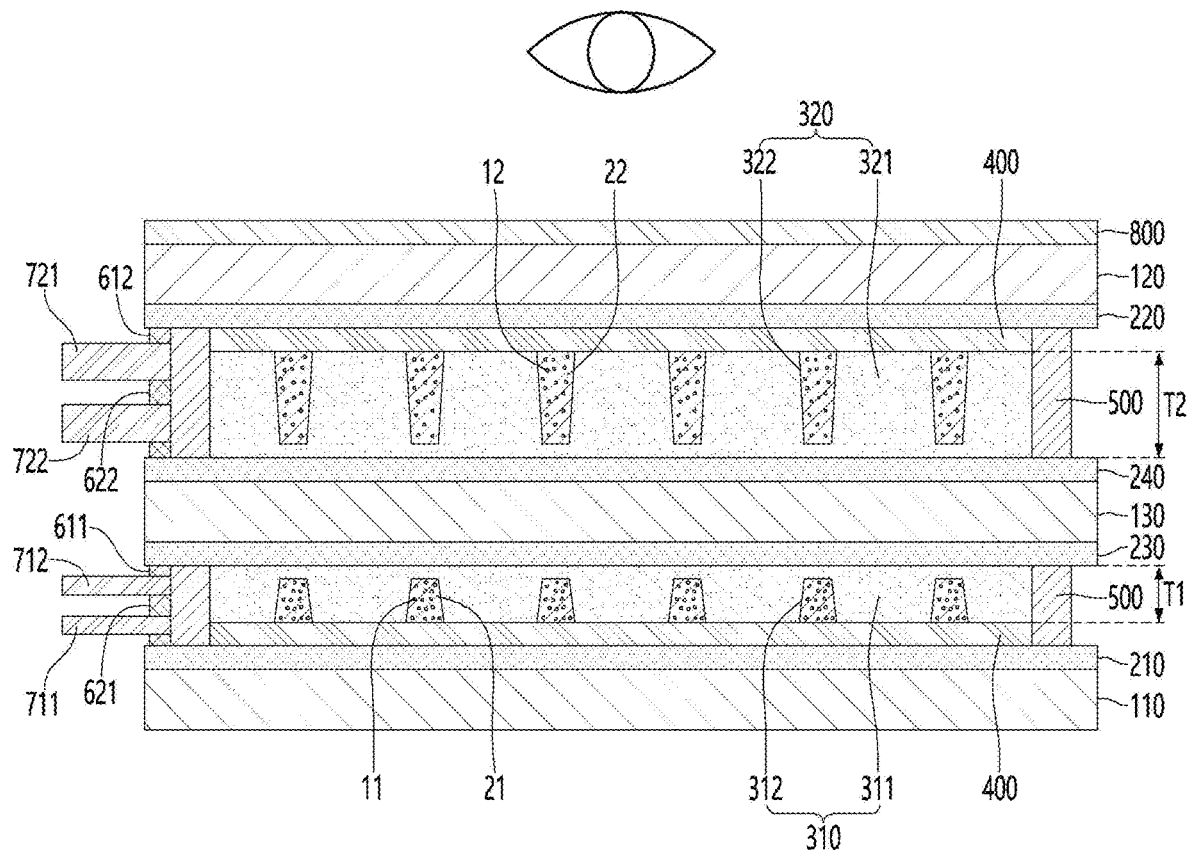
FIGS. 15 to 18 are views showing a cross-sectional view of a light route control member according to second embodiment.
Figure 16:
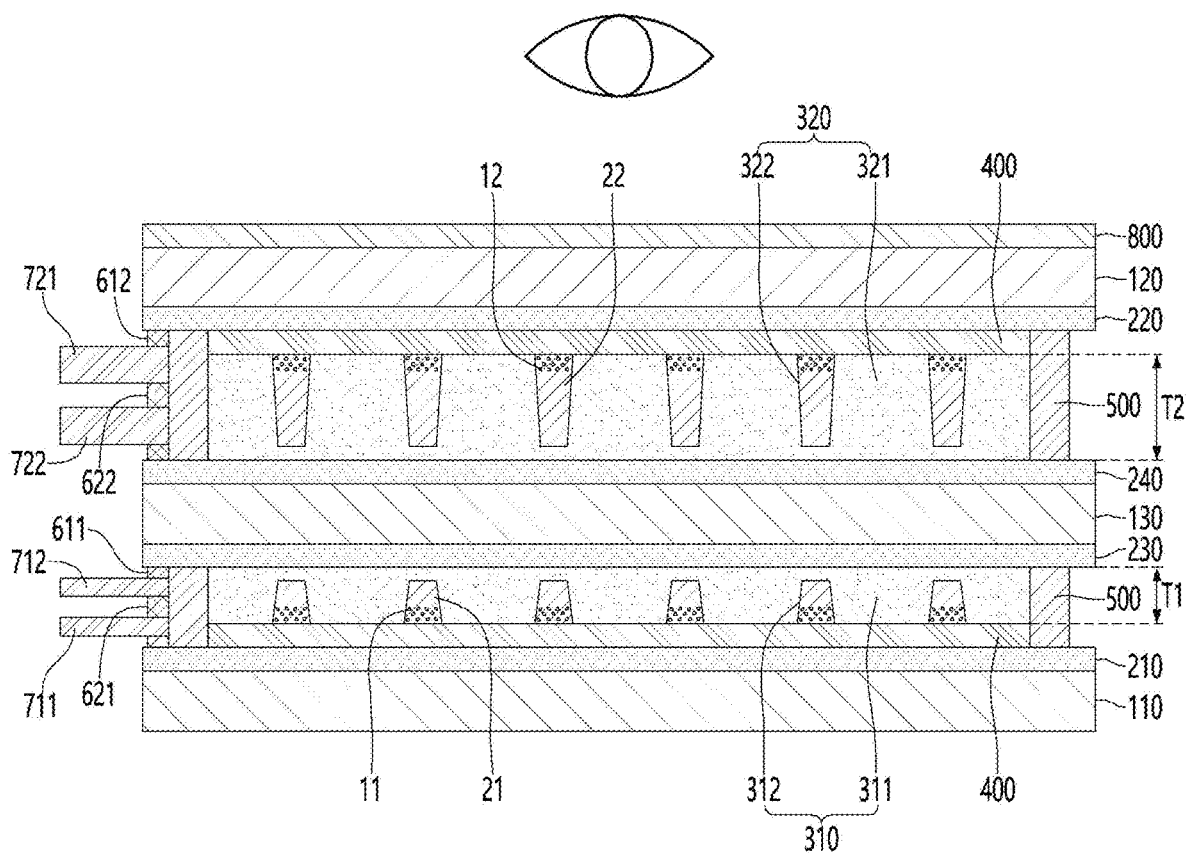
Figure 17:
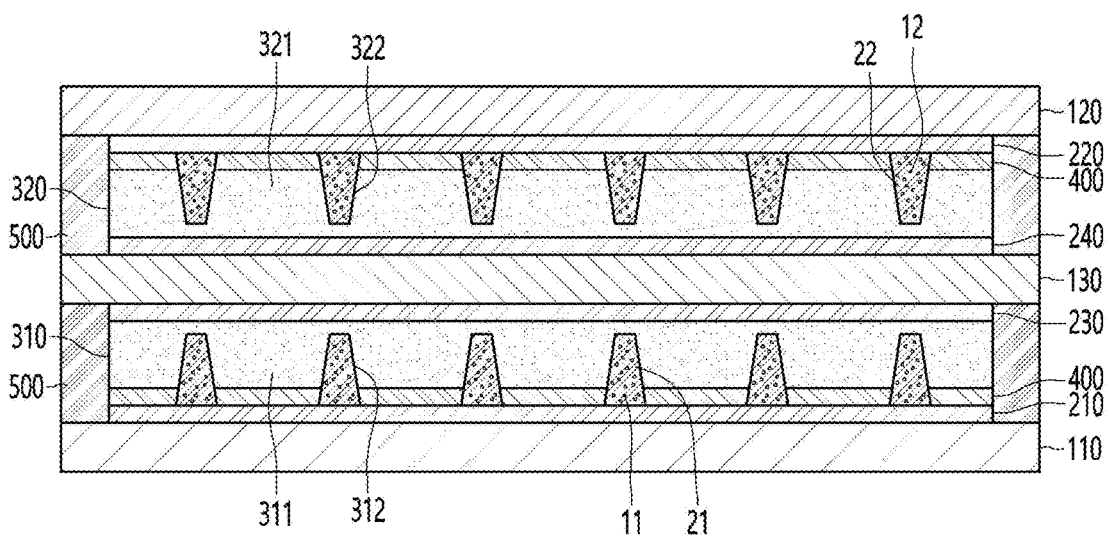
Figure 18:
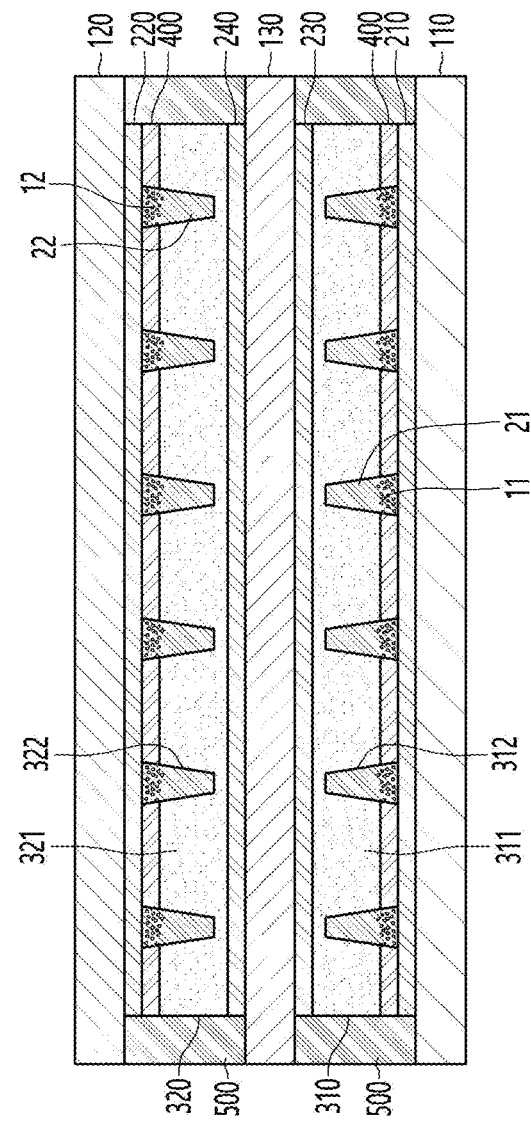

Meanwhile, referring to FIGS. 15 and 16, thicknesses of the first light conversion unit 310 and the second light conversion unit 320 may be different from each other. In detail, a thickness T1 of the first light conversion unit and a thickness T2 of the second light conversion unit may be different from each other. For example, a thickness T1 of the first light conversion unit may be smaller than a thickness T2 of the second light conversion unit.

The driving speed of the light route member may be defined by Equation 1 below, and the moving speed of the light absorbing particles in the dispersion may be defined by Equation 2 below.

$$t_{switch} = \frac{h^2}{\mu V} \quad \text{[Formula 1]}$$

$h$: distance between electrodes (height of partition wall unit)
$\mu$: moving speed
$V$: driving vortage $$\mu = \frac{2\varepsilon\varepsilon_0 \zeta}{3\eta} \quad \text{[Formula 2]}$$

$\varepsilon$: permittivity
$\zeta$: surface charge
$\eta$: viscosity

Referring to Equations 1 and 2, the driving speed of the light route control member is improved as the thickness of the receiving unit is smaller.

That is, the light route control member according to another embodiment may reduce the thickness of the light conversion unit, thereby improving the driving speed of the light route controlling member.

In addition, the thickness of each light conversion unit may be varied and each light conversion unit may be individually driven or simultaneously driven. Accordingly, it is possible to use the light route control member by controlling the transmittance and the viewing angle to suit the environment in which the light route control member is to be used.

In detail, in the light route control member according to another embodiment, the adhesive layer may be disposed only on the first and second partition wall units. That is, the light route control member may be disposed only on the first and second partition wall units after the adhesive layer is patterned, and may not be disposed on the first and second receiving units.

Accordingly, both the first receiving unit 312 and the second receiving unit 322 may be disposed in contact with the electrode.

In detail, the first receiving unit 312 may be disposed in direct contact with the first electrode 210 and the third electrode 230, and the second receiving unit 322 may be disposed in direct contact with the second electrode 220 and the third electrode 230.

Accordingly, resistance due to the adhesive layer in the first receiving unit 312 and the second receiving unit 322 may be reduced. That is, the first receiving unit 312 and the second receiving unit 322 are indirectly contacted with any one of the two electrodes by the adhesive layer, and in this case, the adhesive layer may act as a resistance. Accordingly, the driving voltage may be increased, and driving characteristics may be reduced.

However, in the light route controlling member according to another embodiment, the resistance may be removed by patterning the adhesive layer and disposing it only on the partition wall unit. Thereby, the driving voltage can be reduced and the driving characteristics of the light route control member can be improved.

In addition, when the first and second receiving units and the adhesive layer are in contact with each other, an interference phenomenon caused by the adhesive layer having a polarity is inhibited from occurring, thereby improving the reliability and driving characteristics of the light route control member.

Figure 19:
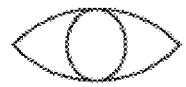
FIGS. 19 and 20 are views for describing one embodiment of the display device to which the light route control member according to the embodiment is applied.
Figure 19:
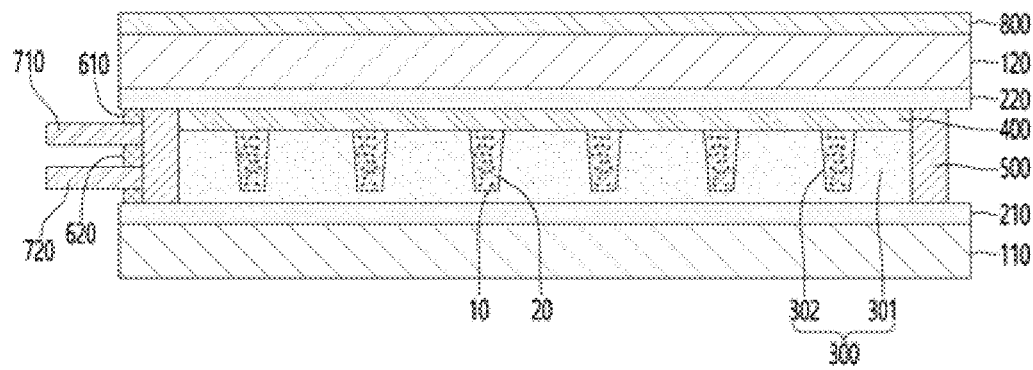
Figure 19:
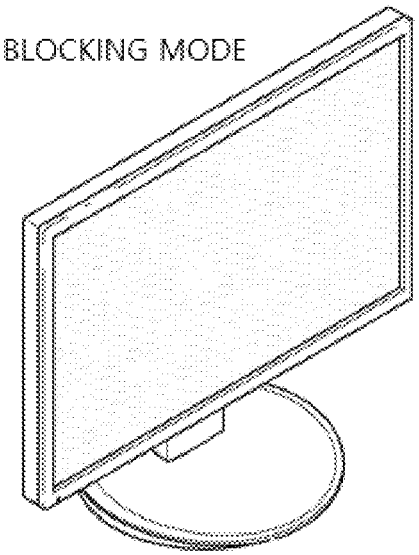
Figure 20:
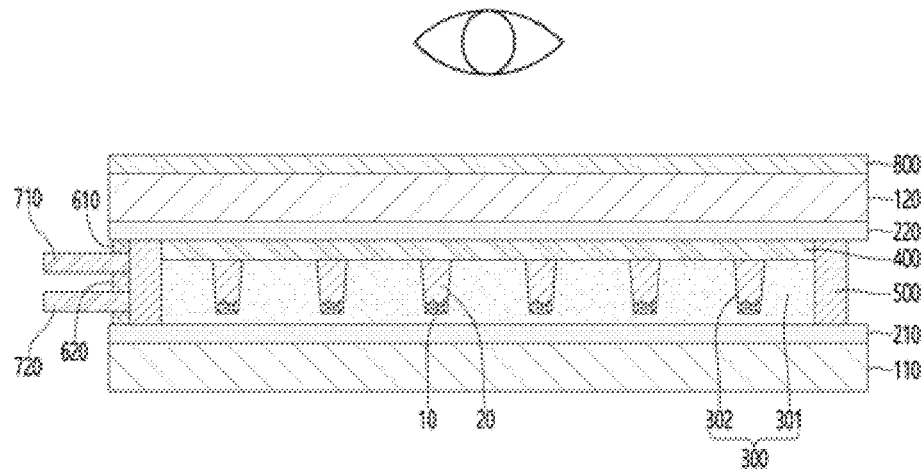
Figure 20:
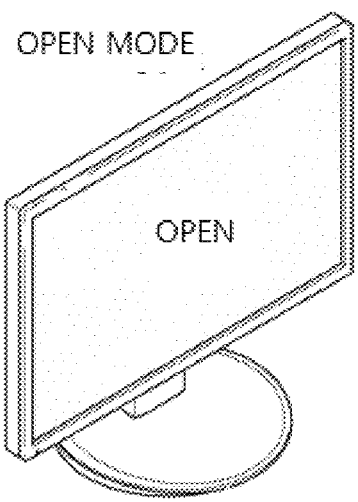

Referring to FIGS. 19 and 20, the light route control member according to the embodiment may be applied to a vehicle.

Referring to FIGS. 19 and 20, the light route control member according to the embodiment may be applied to a display device that displays a display.

For example, when power is not applied to the light route control member as shown in FIG. 19, the receiving unit functions as the light blocking part, so that the display device is driven in a light blocking mode, and when power is applied to the light route control member as shown in FIG. 20, the receiving unit functions as the light transmitting part, so that the display device may be driven in an open mode.

Accordingly, a user may easily drive the display device in a privacy mode or a normal mode according to application of power.

In addition, although not shown in the drawings, the display device to which the light route control member according to the embodiment is applied may also be applied inside the vehicle.

For example, the display device including the light route control member according to the embodiment may display a video confirming information of the vehicle and a movement route of the vehicle. The display device may be disposed between a driver seat and a passenger seat of the vehicle.

In addition, the light route control member according to the embodiment may be applied to a dashboard that displays a speed, an engine, an alarm signal, and the like of the vehicle.

Furthermore, the light route control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. A light route control member comprising:
a first substrate;
a first electrode disposed on an upper surface of the first substrate;
a second substrate disposed on the first substrate;
a second electrode disposed on a lower surface of the second substrate;
a light conversion unit disposed between the first electrode and the second electrode; and
a power supply unit connected to the first electrode and the second electrode,
wherein the light conversion unit includes a partition wall unit and a receiving unit that are alternately disposed,
wherein a light transmittance of the receiving unit is changed according to the application of the voltage,
wherein the receiving unit includes a dispersion and a plurality of light absorbing particles dispersed in the dispersion,
wherein a height of the receiving unit is 15 μm to 25 μm,
wherein a width of the receiving unit is 1.5 μm to 2.5 μm,
wherein a width of the partition wall unit is 4.5 μm to 7.5 μm,
wherein the power supply unit includes a power connection unit for connecting an external power source and a light conversion unit; and a power switch unit configured to turn on-off the voltage transfer.

2. The light route control member of claim 1, wherein a ratio of the height to the width of the receiving portion (height/width) is 10 or less.

3. The light route control member of claim 1, wherein a driving voltage of the power connection unit is 5V or less.

4. A light route control member comprising:
a first substrate;
a first electrode disposed on an upper surface of the first substrate;
a second substrate disposed on the first substrate;
a second electrode disposed on a lower surface of the second substrate;
a third substrate disposed between the first substrate and the second substrate;
a third electrode disposed on a lower surface of the third substrate;
a fourth electrode disposed on a upper surface of the third substrate;
a first light conversion unit disposed between the first electrode and the third electrode;
a second light conversion unit disposed between the second electrode and the fourth electrode;
a power supply unit connected to the first electrode, the second electrode, the third electrode and the fourth electrode,
wherein the first light conversion unit includes a first partition wall unit and a first receiving unit that are alternately disposed,
wherein the second light conversion unit includes a second partition wall unit and a second receiving unit that are alternately disposed,
wherein a light transmittance of the first and second receiving units is changed according to the application of the voltage,
wherein the first and second receiving units include a dispersion and a plurality of light absorbing particles dispersed in the dispersion,
wherein a height of the first and second receiving units is 15 μm to 25 μm,
wherein a width of the first and second receiving units is 1.5 μm to 2.5 μm,
wherein the power supply unit includes a power connection unit for connecting an external power source and a light conversion unit; and a power switch unit configured to turn on-off the voltage transfer.

5. The light route control member of claim 4, wherein the first light conversion unit and the second light conversion unit are driven separately from each other.

6. The light route control member of claim 4, wherein a thickness of the first light conversion unit is different from a thickness of the second light conversion unit.

7. The light route control member of claim 4, wherein the first receiving unit and the second receiving unit extend in the same direction.

8. The light route control member of claim 4, wherein the first receiving unit and the second receiving unit extend in the different direction.

9. The light route control member of claim 4, wherein the first electrode is connected to a 1-1 wiring electrode,
wherein the third electrode is connected to a 1-2 wiring electrodes,
wherein the second electrode is connected to a 2-1 wiring electrode,
wherein the fourth electrode is connected to a 2-2 wiring electrode;
wherein the 1-1 wiring electrode, the 1-2 wiring electrode, the 2-1 wiring electrode, and the 2-2 wiring electrode are connected in parallel.

10. A display device comprising;
a display panel; and a light route control member of claim 1 disposed on or under the display panel,
wherein the display panel includes a liquid crystal display panel or an organic light emitting display panel.

11. The light route control member of claim 4,
wherein a height of the first and second receiving units is 15 μm to 25 μm,
wherein a width of the first and second receiving units is 1.5 μm to 2.5 μm,
wherein a width of the partition wall unit is 4.5 μm to 7.5 μm.

12. The light route control member of claim 4, wherein a ratio of the height to the width of the receiving portion (height/width) is 10 or less.

13. The light route control member of claim 4, wherein the power supply unit includes a power connection unit for connecting an external power source and a light conversion unit; and a power switch unit configured to turn on-off the voltage transfer.

14. The light route control member of claim 9, wherein the 1-1 wiring electrode and the 1-2 wiring electrode are insulated through a first insulating layer between the 1-1 wiring electrode and the 1-2 wiring electrode;
Wherein the 2-1 wiring electrode and the 2-2 wiring electrode are insulated through a second insulating layer between the 2-1 wiring electrode and the 2-2 wiring electrode.

15. The light route control member of claim 4, wherein the first receiving unit and the second receiving unit are disposed overlapping each other.

16. The light route control member of claim 15, wherein the first receiving unit and the second receiving unit include an overlapping area and a non-overlapping area,
wherein a width of the overlapping area is greater than a width of the non-overlapping area.

17. The light route control member of claim 16, wherein the width of the non-overlapping area is 10% or less of the entire area.

18. The light route control member of claim 4, wherein the first light conversion unit and the second light conversion unit are driven simultaneously.

19. The light route control member of claim 4, wherein a thickness of the first light conversion unit is smaller than a thickness of the second light conversion unit.

20. The light route control member of claim 4, wherein a driving voltage of the power connection part is 5V or less.

* * * * *